A. B. COUCH.
SURGICAL INSTRUMENT.
APPLICATION FILED MAY 24, 1921.
1,417,142.
Patented May 23, 1922.
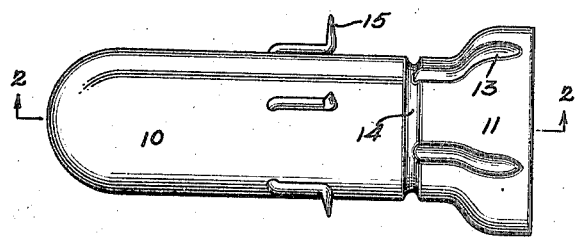
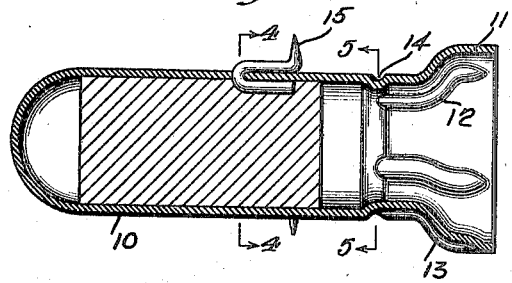
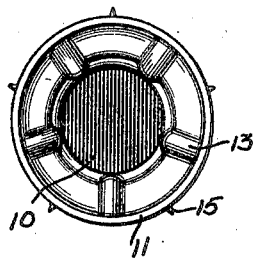 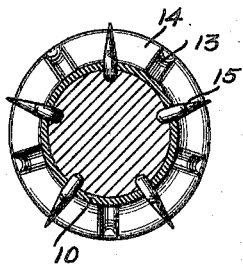 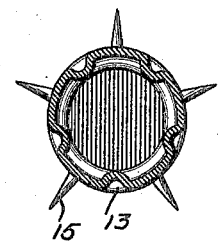
WITNESSES
INVENTOR
A. B. Couch.
BY
ATTORNEYS

UNITED STATES PATENT OFFICE.

ALBERT B. COUCH, OF MARLIN, TEXAS.

SURGICAL INSTRUMENT.

1,417,142.    Specification of Letters Patent.    Patented May 23, 1922.

Application filed May 24, 1921. Serial No. 472,044.

*To all whom it may concern:*

Be it known that I, ALBERT B. COUCH, a citizen of the United States, and a resident of Marlin, in the county of Falls and State of Texas, have invented a new and Improved Surgical Instrument, of which the following is a description.

My invention relates to an instrument for use in performing the operation of circumcision and has for its general object to provide an instrument whereby the stated operation may be performed essentially without pain and bloodlessly.

The invention has for a further object to provide an instrument for the stated use so formed that the glands cannot be injured in the operation.

Reference is to be had to the accompanying drawings forming a part of this specification, it being understood that the drawings are merely illustrative of one example of the invention.

Figure 1 is a side elevation of the instrument;

Figure 2 is a longitudinal section on line 2—2, Figure 1;

Figure 3 is a front end view;

Figures 4 and 5 are cross sections on the lines 4—4, and 5—5, Figure 2.

In carrying out my invention in accordance with the illustrated example, a barrel-like body 10 is formed with its open end 11 of enlarged diameter adapted for the insertion of the organ to be operated on, the fore-skin in practice being drawn over said open end to telescope the same. At the interior of the open end 11 are longitudinal ribs 12 at intervals against which the organ bears, said ribs presenting longitudinal grooves 13 adapted to receive a surgical needle at the exterior of the end 11. An annular groove 14 is formed at the exterior, and from said groove 14 the longitudinal grooves 13 lead.

Forward of the annular groove 14 the barrel or body 10 is provided with spurs 15 with which the forward end of the fore-skin may be engaged, after which a ligature is made secure just in front of the spurs 15. A second ligature is made secure near the expanded portion of the barrel, and the excision is then performed.

A curved scissors, the curvature of which corresponds approximately with the cylindrical surface of body 10, is caused to follow annular groove 14 as a guide, for severing the surplus fore-skin. Then with curved needle, the operator follows the annular and longitudinal grooves and stitches the outer and inner skins under the adjacent ligature. The operation may thus be quickly and neatly performed. It has been found that healing sets in by first intention because the fore-skin has not been bruised as with ordinary instruments and there has been no zig-zag or uneven cutting.

I would state in conclusion that while the illustrated example constitutes a practical embodiment of my invention, I do not limit myself strictly to the exact details herein illustrated, since manifestly the same can be considerably varied without departure from the spirit of the invention as defined in the appended claims.

Having thus described my invention, I claim:

1. An instrument of the class described having a body adapted at one end to receive the organ to be operated upon, there being longitudinal needle grooves at said end at the exterior, as well as an annular groove from which said longitudinal grooves lead, and means on said body at the exterior beyond said grooves, with which the surplus portion to be removed may be engaged.

2. An instrument of the class described having a body into an end of which the organ to be operated upon may be inserted that the fore-skin may be disposed at the exterior of said end, said body presenting an annular exterior scissors groove and longitudinal needle grooves adjacent to said end.

3. An instrument of the class described having a body into an end of which the organ to be operated upon may be inserted that the fore-skin may be disposed at the exterior of said end, said body presenting an annular exterior scissors groove and longitudinal needle grooves adjacent to said end, and spurs on said body beyond the scissors groove for engaging the surplus part to be severed.

ALBERT B. COUCH, M. D.